Figure 1:
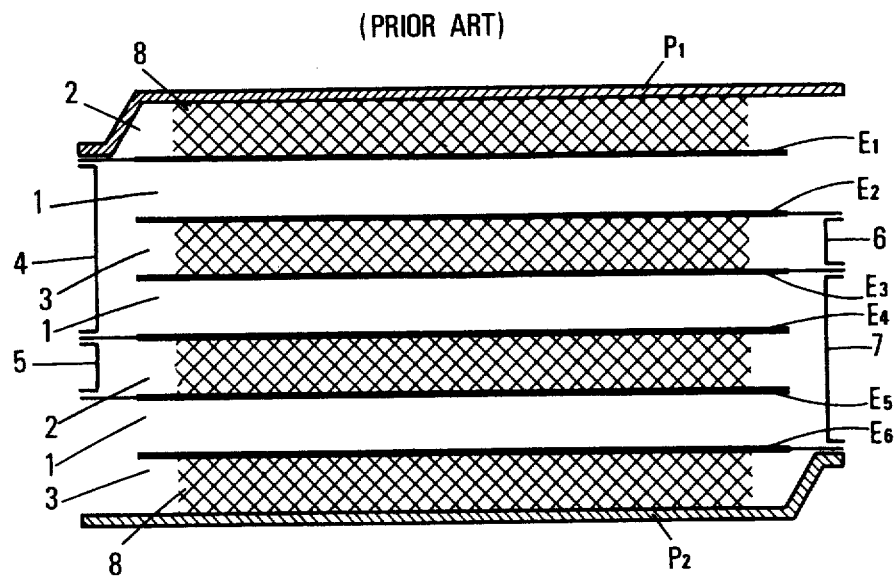

United States Patent

Grehier et al.

[11] 4,037,023
[45] July 19, 1977

[54] FUEL CELLS

[75] Inventors: Alain Grehier, Paris; Jacques Chéron, Maisons-Lafitte, both of France

[73] Assignee: Institut Francais du Petrole, France

[21] Appl. No.: 657,535

[22] Filed: Feb. 12, 1976

[30] Foreign Application Priority Data

Feb. 25, 1975  France .............................. 75.05826

[51] Int. Cl.$^2$ .............................................. H01M 8/00
[52] U.S. Cl. ..................................................... 429/12
[58] Field of Search ............ 136/86 R, 120 FC, 86 D; 13/12; 429/34

[56] References Cited

U.S. PATENT DOCUMENTS

| | | | |
|---|---|---|---|
| 2,969,315 | 1/1961 | Bacon | 136/120 FC |
| 3,234,050 | 2/1966 | Beltzer et al. | 136/120 FC |
| 3,432,357 | 3/1969 | Dankese | 136/86 R |
| 3,589,942 | 6/1971 | Leitz et al. | 136/86 D |
| 3,746,578 | 7/1973 | Warzowski | 136/86 R |
| 3,764,391 | 10/1973 | Warzowski | 136/86 D |

*Primary Examiner*—John H. Mack
*Assistant Examiner*—H. A. Feeley
*Attorney, Agent, or Firm*—Craig & Antonelli

[57] ABSTRACT

In this fuel cell formed of a stack of electrodes, each electrode is provided, on one of its faces, with protrusions or ribs of limited height which contact the opposite face of an adjacent electrode of the stack.

21 Claims, 11 Drawing Figures

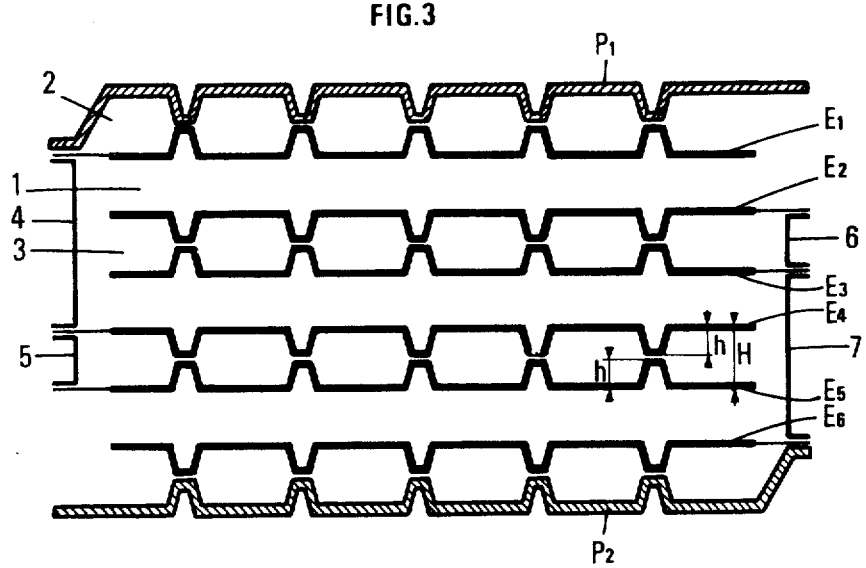
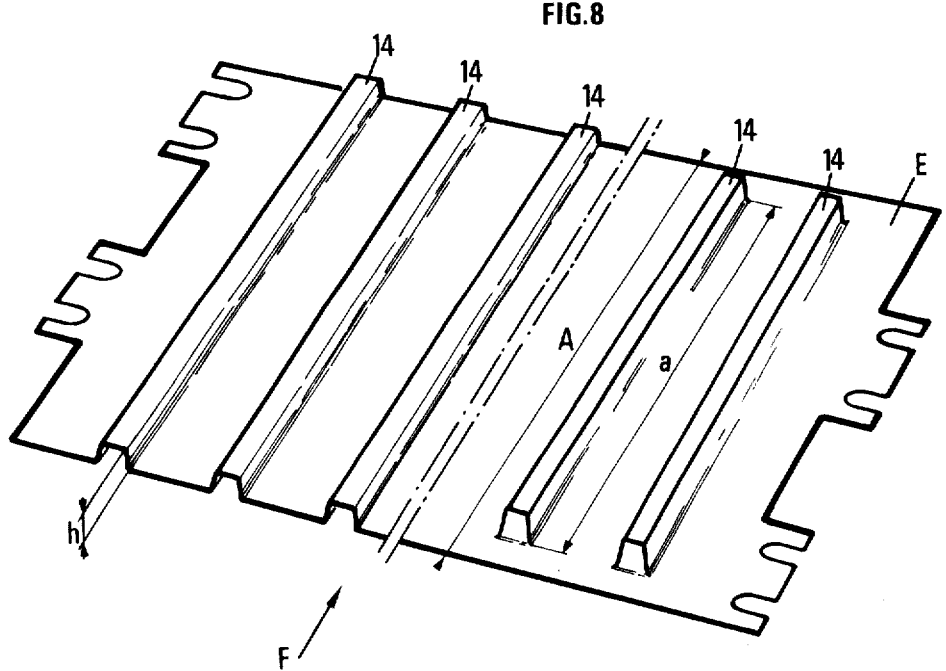

FUEL CELLS

The present invention relates to an improvement in fuel cells.

Fuel cells comprise a stack of elements which delimit between one another compartments for an electrolyte, such as a solution of potassium hydroxide, compartments for the flow of a fuel, such as hydrogen, and compartments for the flow of a combustion sustaining fluid, or oxidant, such as pure oxygen, or oxygen of the air, the compartments for the flow of these reactants being located on both sides of the compartments which contain the electrolyte.

In one embodiment, all these elements are formed of electrodes which are generally of small thickness and require insulating separators to maintain a proper spacing between the electrodes and prevent deformation thereof, in the case of deformable electrodes.

The use of separators which have only a mechanical purpose and do not interfere with the phenomenon of electric power delivery by the fuel cell, suffers however from some drawbacks.

First, these separators increase the weight of the fuel cell, which results in a reduction of the power per mass unit of the fuel cell.

Moreover, since they are located in the compartments of the fuel cell wherethrough the reactants flow, they cause in this flow of reactants, substantial pressure drops which must be compensated for by an oversizing of the compartments containing these reactants, or, when these reactants are gaseous, makes it necessary to use gases under higher pressure.

In other embodiments of fuel cell blocks, only the elements separating a compartment containing the electrolyte from a compartment containing a reactant are constituted by electrodes. The elements separating two compartments traversed by reactants are formed of tight electrically conducting metal sheets, located between two electrodes. These sheets are generally of corrugated shape and also provide for electrical connection between two adjacent electrodes which they contact and their purpose is also to maintain the spacing of these electrodes.

The main object of the invention is to permit the omission of insulating separators used in fuel cells of the first above-mentioned type in order to reduce the weight and/or the volume of the fuel cell, and in any case, to simplify and facilitate the stacking of the elements constituting the fuel cell block.

According to particularly advantageous embodiments of the invention, applied to a fuel cell having a liquid electrolyte flowing through the corresponding compartments of the fuel cell, it is possible to considerably reduce the volume of these compartments, and accordingly the weight of the fuel cell.

Figure 2:
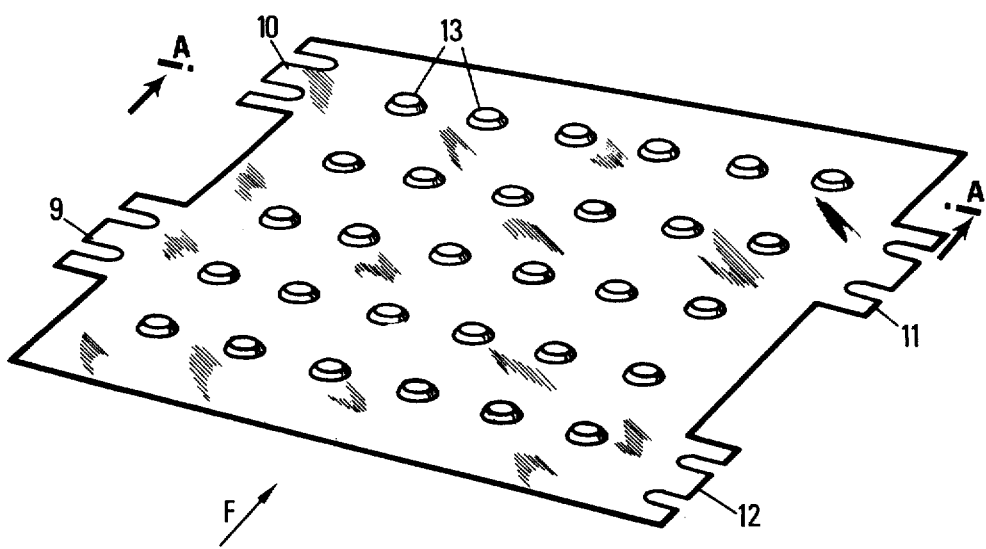
Figure 4:
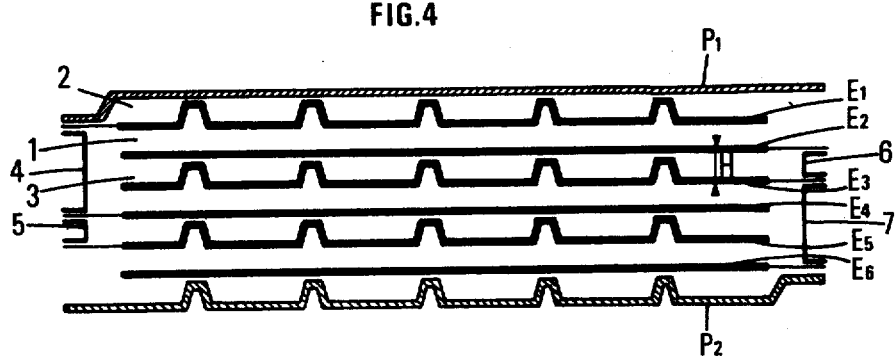
Figure 10:
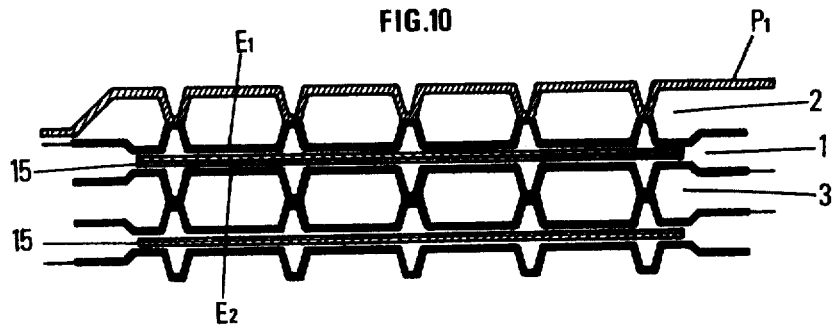
Figure 9:
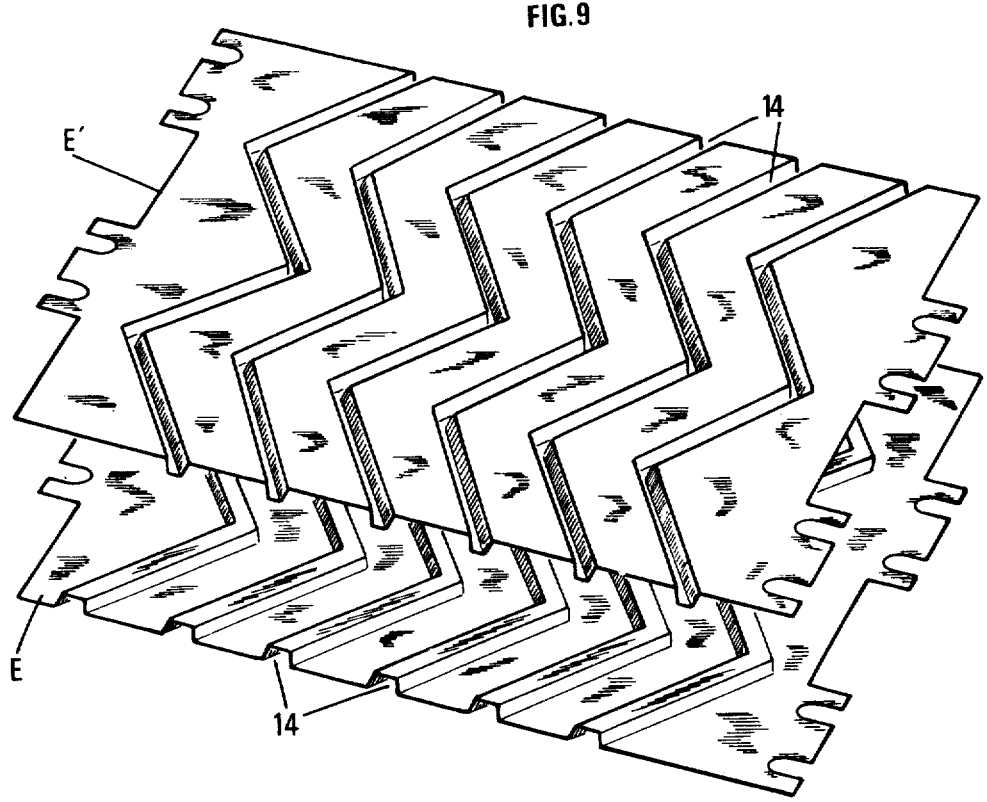
Figure 11:
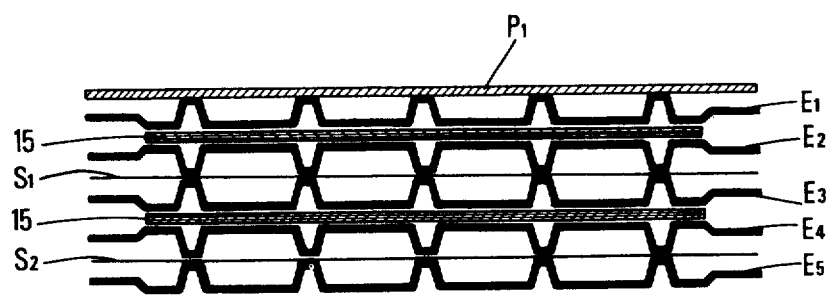

The invention will be understood and advantages thereof appear from the following description of non-limitative embodiments illustrated by the accompanying drawings, wherein:

FIG. 1 is a diagrammatic cross-section of a fuel cell of the prior art,

FIG. 2 is a perspective view of an electrode equipping a fuel cell according to the invention, FIG. 3 digrammatically illustrates, in cross-section, a fuel cell according to the invention, FIG. 4 is a modification of FIG. 3, FIGS. 5, 6 and 7 show different possible configurations of the protrusions 13, FIG. 8 illustrates another embodiment of a fuel cell electrode according to the invention, FIG. 9 diagrammatically shows an alternative embodiment of FIG. 8, FIG. 10 shows partially in cross-section a stack of electrodes wherein the volume of the compartments fed with electrolyte is considerably reduced, and, FIG. 11 illustrates another embodiment of the stack of the fuel cell elements.

FIG. 1 diagrammatically shows, in cross-section, a first type of fuel cell of the prior art.

This fuel cell comprises a block formed of a stack of flat electrodes $E_1, E_2, E_3$... which delimit spaces, such as 1, containing an electrolyte, such as, for example, a solution of potassium hydroxide, spaces, such as 2, wherethrough flows a fuel, for example hydrogen $H_2$, and spaces such as 3 wherethrough circulates an oxidant, such as pure oxygen $O_2$, or air, the spaces receiving these reactants being located on both sides of the space fed with electrolyte.

The electroylyte is fed along a direction perpendicular to the plane of the drawing.

The electrodes are coated with suitable catalysts, promoting electro-chemical reactions at the contact with the electrolyte, as is well known in the art.

The electrodes are electrically connected to each other, for instance, but not limitatively, as shown in FIG. 1, through electrically conducting strips 4, 5, 6 and 7. References $P_1$ and $P_2$ designate metal plates at the ends of the electrode stack.

In the compartments fed with fuel and in those fed with an oxidant are placed separators which maintain the spacing of these electrodes.

These separators increase the weight of the fuel cell block and cause a substantial pressure drop in the flow of fluid reactants, especially gas reactants.

The present invention makes it possible to omit these separators, by using electrodes such as that illustrated in perspective in FIG. 2.

Figure 7:
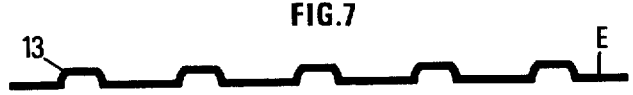

This electrode provided at its periphery with ear-shaped elements 9 to 12 for connection with electric connecting strip such as strips 4 to 7 illustrated in FIG. 7, showing, by way of example only, a possible way of interconnecting the different electrodes, has protrusions 13 on its face delimiting a compartment fed with a fluid reactant during operation of the fuel cell.

These protrusions 13 are so distributed that, upon stacking the electrodes, the protrusions of an electrode bear on the protrusions of the adjacent electrode, so as to delimit therewith a compartment for a fluid reactant, as shown by FIG. 3 which diagrammatically illustrates in cross-section a fuel cell according to the invention.

These protrusions are preferably obtained by a stamping, or embossing operation, their shape and distribution being selected in accordance with the electrode size (i.e. thickness, length, width etc . . . ), the material constituting these electrodes and the maximum acceptable pressure drop in the flows of fluid reactants through the fuel cell block etc . . .

In the embodiment of FIG. 3, the height $h$ of the protrusions 13 is equal to one half of the spacing H between two electrodes delimiting a compartment supplied with fluid reactant.

It would be however possible, without departing from the scope of the present invention, to provide protrusions 13 having a height equal to the whole of said above-defined spacing, on at least one of the electrodes delimiting said compartments, as illustrated by FIG. 4.

It is, of course, also possible to have two adjacent electrodes with protrusions of different heights, provided that said protrusions bear on each other in a position of closeness of the electrodes and if the sum of the respective heights of two protrusions facing each other is equal to the spacing H to be maintained between the electrodes.

Figure 5:
Figure 6:

FIGS. 5, 6 and 7 represent an electrode E, in cross-section along line A—A of FIG. 2, and illustrate, by way of non-limitating embodiments, different configurations which may be selected for the protrusions 13.

In FIG. 5, the protrusions are of frustro-concial shape.

In FIG. 6, the protrusions 13 are shaped as a spherical cap and in FIG 7, as a flattened spherical cap.

FIG. 8 illustrates another embodiment of an electrode wherein the bosses 13 have been replaced by ribs 14 obtained by stamping or embossing.

Preferably, but not exclusively, these ribs extend in the direction of flow of the reactants through the fuel cell block or are oriented along a direction having at least one component along this direction of flow F.

The ribs 14 are rectilinear and may have a length $a$ equal to the length A of the electrode E, as illustrated on the left side of FIG. 8. It will however be possible to have ribs of a length $a$ smaller than the length A of the electrode E (right side of FIG. 8).

The cross-section of the ribs may be trapezoidal, cylindrical ... etc ..., these examples being by no way limitative.

As in the case of the protrusions 13 (FIGS. 2 to 7) the height $h$ of the ribs may be equal to H or to H/2, H being the spacing of two electrodes which delimit a compartment containing a fluid reactant in the fuel cell block.

FIG. 9 illustrates another embodiment of the ribs 14 of an electrode. These ribs have generally the shape of a broken line.

The electrode facing the electrode E shown by FIG. 8 may have similar ribs, so located that in the position of stacking of the electrodes the ribs of an electrode exactly covers those of an adjacent electrode. Preferably the electrode E' facing electrode E will be provided with ribs so located that in a position of closeness of the electrodes E and E' the ribs facing each other have only a few contact points.

The ribs 14 of the adjacent electrodes E and E' may also be symmetrical inclined with respect to the direction F of FIG. 8, having thus a plurality of contact points in their position of closeness.

It will be of course possible to use electrodes whose ribs are of different geometrical configuration, provided that in a position of closeness of the electrodes, opposite ribs have a few points of contact with each other. For example it will be possible to associate in one and the same stack of electrodes an electrode such as that illustrated in FIG. 8 and an electrode E as shown in FIG. 9.

The so-realized ribs have, with respect to the protrusions 13 of FIG. 2, the advantage of a stiffening of the electrodes which are generally of a small thickness.

It appears from the foregoing that suppressing the conventional separators between the electrodes provides, for a given nominal power of a fuel cell, the following advantages:

a reduction in the weight of the fuel cell, a reduction of the pressure drops in the flow of the reactants feeding the fuel cell block, which permits to reduce the spacing of the electrodes delimiting the compartments wherethrough the reactants flow, and consequently to reduce the volume of the fuel cell block, and a simplification of the operation of stacking the electrodes.

The electrodes of the type illustrated by FIGS. 8 and 9, whose ribs extend substantially in the direction of flow of the fluids, has an additional advantage, in the case of fuel cells using a liquid electrolyte flowing through the electrolyte compartments because the formation of the ribs 14 by stamping or embossing provide channels in the faces of the electrodes delimiting the electrolyte compartment. These channels facilitate the flow of liquid electrolyte.

It is then possible, as shown in FIG. 10, to reduce the spacing of the electrodes $E_1$ and $E_2$ delimiting the electrolyte compartments, to a value of about one tenth of a millimeter, this spacing being maintained by any suitable means, for example by using a thin sheet of felt 15, which will be impregnated by the electrolyte.

Such an arrangement will thus permit to reduce the volume of the fuel cell, and the required quantity of electrolyte as well as the weight of the fuel cell.

As a matter of fact the weight of electrolyte contained in a fuel cell according to the invention as diagrammatically illustrated by FIG. 9, may represent only 10% to 20% of the weight of the dry fuel cell block, while in a prior art fuel cell of the same power the weight of electrolyte contained in the fuel cell block represents about 50% of the weight of the dry block.

Moreover this reducton in the weight of electrolyte of the fuel cell results also in a reduction of the required weight of electrolyte in the intermediate regulation tank provided in the circuit feeding the fuel cell with electrolyte, this regulating tank being used to maintain substantially constant the electrolyte concentration during operation of the fuel cell.

Due to this improvement according to the invention the weight of electrolyte in this regulating tank may be reduced by nearly one half.

However technological difficulties during fabrication of the fuel cell may arise if the spacing of the electrodes $E_1$ and $E_2$ were smaller.

To obviate this drawback, the edges of the electrodes may be advantageously deformed so that in the stack of electrodes, these edges have a greater spacing than the electrochemically active portions of the electrodes.

FIG. 11 diagrammatically illustrates another embodiment of the fuel cell block, formed by stacking different elements comprising electrodes $E_1$, $E_2$... which delimit an electrolyte compartment and a compartment traversed by a fluid reactant.

In this embodiment, plane elements $S_1$, $S_2$ are located between the faces of the two adjacent electrodes which are provided with the protrusions or ribs. These plates $S_1$, $S_2$ contact these protrusions and delimit with each adjacent electrode a compartment wherethrough a reactant fluid can flow.

Depending on the kind of electric connection which is aimed at, these plates can be insulating or electrically conducting. In this last case they may electrically contact the protrusions of the adjacent electrodes, the height of these protrusions being then equal to the thickness of the compartments fed with fluid reactants.

In such an embodiment, the plates $S_1$ may be of small thickness and thus of lower weight than that of corrugated separators used according to the invention.

Modifications can be made without departing from the scope of the present invention. For example stamped, or embossed, electrodes may be used, so that on the face of each electrode delimiting a compartment which contains a fluid reactant simultaneously appear two protrusions, such as those shown in FIG. 2, and ribs, such as those illustrated in FIGS. 8 or 9, these ribs and protrusion intersecting or not one another.

We claim:

1. In an improved fuel cell of the type comprising a fuel cell block formed of a stack of electrodes which delimit between each other first compartments containing an electrolyte and second compartments for the circulation of fluid reactants, said second compartments being located at opposite sides of said first compartments, wherein the improvement comprises each of said electrodes being provided, on its face adjacent to said second compartments, with protrusions, the protrusions of one electrode bear on the protrusions of the adjacent electrode in the stack.

2. A fuel cell according to claim 1, wherein the height of said protrusions is equal to one half of the thickness of said compartment delimited between the said adjacent electrodes.

3. A fuel cell according to claim 1, wherein said protrusions are formed by stamping the electrode.

4. A fuel cell according to claim 1 wherein said protrusions comprise ribs formed by stamping the electrode.

5. A fuel cell according to claim 4, wherein said ribs are rectilinear.

6. A fuel cell according to claim 4, wherein said ribs have the shape of a broken line.

7. A fuel cell according to claim 4, wherein said ribs are oriented in a direction having at least one component parallel to the direction of flow of the fluid through the fuel cell block.

8. A fuel cell according to claim 7; wherein the spacing between the faces of adjacent electrodes of the stack which delimit said first compartments is of reduced thickness and a porous insulating material is positioned between said faces, and wherein the edge of said electrodes are so deformed that the spacing of the edges of said adjacent electrodes which delimit said first compartments is greater than that of the electrochemically active portions of these electrodes.

9. A fuel cell according to claim 1, wherein the protrusions are formed of ribs, the ribs of an electrode bearing at least one point, on the ribs of the adjacent electrode.

10. A fuel cell according to claim 1, wherein said protrusions comprise both ribs and bosses.

11. A fuel cell according to claim 9, wherein the ribs of the adjacent electrodes are symmetrically inclined relatively to a common direction.

12. A fuel cell according to claim 9, wherein said ribs are oriented in a direction having at least one component parallel to the direction of flow of the fluid through the fuel cell block.

13. A fuel cell according to claim 12, wherein the spacing between the faces of adjacent electrodes of the stack which delimit said first compartments is of reduced thickness and a porous insulating material is positioned between said faces, and wherein the edge of said electrodes are so deformed that the spacing of the edges of said adjacent electrodes which delimit said first compartment is greater than that of the electrochemically active portions of these electrodes.

14. A fuel cell according to claim 1, wherein at least one supply means is further provided for supplying said fuel cell block with said fluid reactants.

15. A fuel cell according to claim 1, wherein the adjacent electrodes having the protrusions in contact therewith are arranged at the same electrical potential.

16. A fuel cell according to claim 1, wherein separating members are provided between the respective adjacent electrodes having the protrusions in contact therewith, said separating members defining with each of said adjacent electrodes a respective compartment for circulation of said fluid reactants.

17. A fuel cell according to claim 16, wherein said separating members are insulating.

18. A fuel cell according to claim 16, wherein said separating members are electrically conducting.

19. A fuel cell according to claim 13, wherein separating members are provided between the respective adjacent electrodes having the protrusions in contact therewith, said separating members defining with each of said adjacent electrodes a respective compartment for circulation of said fluid reactants.

20. A fuel cell according to claim 19, wherein said separating members are insulating.

21. A fuel cell according to claim 19, wherein said separating members are electrically conducting.

* * * * *